(12) United States Patent
Shetty et al.

(10) Patent No.: US 11,922,377 B2
(45) Date of Patent: Mar. 5, 2024

(54) DETERMINING FAILURE MODES OF DEVICES BASED ON TEXT ANALYSIS

(71) Applicant: SAP SE, Walldorf (DE)

(72) Inventors: Rashmi B. Shetty, Fremont, CA (US); Simon Lee, San Ramon, CA (US)

(73) Assignee: SAP SE, Walldorf (DE)

(*) Notice: Subject to any disclaimer, the term of this patent is extended or adjusted under 35 U.S.C. 154(b) by 55 days.

(21) Appl. No.: 15/927,068

(22) Filed: Mar. 20, 2018

(65) Prior Publication Data
US 2019/0317480 A1 Oct. 17, 2019

Related U.S. Application Data

(60) Provisional application No. 62/576,555, filed on Oct. 24, 2017.

(51) Int. Cl.
*G06F 40/30* (2020.01)
*G05B 19/418* (2006.01)
(Continued)

(52) U.S. Cl.
CPC ......... *G06Q 10/20* (2013.01); *G05B 19/4184* (2013.01); *G06F 18/214* (2023.01);
(Continued)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS 8,265,912 B2 * 9/2012 Rajendran ............... G06F 30/23
703/7
8,886,623 B2 11/2014 Garg et al.
(Continued)

FOREIGN PATENT DOCUMENTS

| CN | 107103363 A | 8/2017 |
| EP | 1970846 A1 | 9/2008 |

OTHER PUBLICATIONS

Extended European Search Report for EP Application No. 18201755.8 dated Jan. 8, 2019, 8 pages.

*Primary Examiner* — Lamont M Spooner
(74) *Attorney, Agent, or Firm* — Fountainhead Law Group P.C.

(57) ABSTRACT

Some embodiments provide a program that retrieves a set of notifications describing failures that occurred on a set of monitored devices. The program further determines a set of topics based on the set of notifications. The program also determines failure modes associated with the set of topic from a plurality of failure modes defined for the set of monitored devices. The program further determines failure modes associated with the set of notifications based on the set of topics and the failure modes associated with the set of topics. The program also receives a particular notification that includes a particular set of words describing a failure that occurred on a particular monitored device in the set of monitored devices. The program further determines a failure mode associated with the particular notification based on the particular set of words and the determined failure modes associated with the set of notifications.

20 Claims, 8 Drawing Sheets

(51) Int. Cl.
*G06F 18/214* (2023.01)
*G06F 18/24* (2023.01)
*G06F 40/20* (2020.01)
*G06Q 10/20* (2023.01)
*G06V 30/413* (2022.01)

(52) U.S. Cl.
CPC ............. *G06F 18/24* (2023.01); *G06F 40/20* (2020.01); *G06V 30/413* (2022.01)

(56) References Cited

U.S. PATENT DOCUMENTS

| | | | | |
|---|---|---|---|---|
| 9,069,737 | B1* | 6/2015 | Kimotho | G06F 11/079 |
| 9,317,360 | B2* | 4/2016 | Vargas | G06F 11/0724 |
| 9,710,122 | B1* | 7/2017 | Pillay | H04L 41/12 |
| 10,242,330 | B2* | 3/2019 | Daya | G06Q 10/0633 |
| 10,268,684 | B1* | 4/2019 | Denkowski | G06F 40/44 |
| 10,284,585 | B1* | 5/2019 | Kennedy | H04L 63/1425 |
| 10,592,328 | B1* | 3/2020 | Thompson | G06F 11/0793 |
| 10,628,250 | B2* | 4/2020 | Chafle | G06F 11/079 |
| 2002/0039116 | A1* | 4/2002 | Hashimoto | G06F 3/1281 |
| | | | | 347/5 |
| 2008/0066083 | A1* | 3/2008 | Ladd | H04L 67/16 |
| | | | | 719/318 |
| 2008/0082683 | A1* | 4/2008 | DelloStritto | H04L 9/0816 |
| | | | | 709/236 |
| 2008/0263404 | A1* | 10/2008 | Vidiyala | G06F 11/0709 |
| | | | | 714/38.14 |
| 2009/0177926 | A1* | 7/2009 | Schneider | G06F 11/2294 |
| | | | | 714/37 |
| 2010/0095163 | A1* | 4/2010 | Ishihara | G06F 11/2215 |
| | | | | 714/E11.2 |
| 2011/0066908 | A1* | 3/2011 | Bartz | G06F 11/0709 |
| | | | | 714/746 |
| 2012/0239668 | A1* | 9/2012 | Bhattacharyya | G06F 40/30 |
| | | | | 707/754 |
| 2014/0149411 | A1* | 5/2014 | Anand | G06F 16/35 |
| | | | | 707/737 |
| 2014/0172371 | A1* | 6/2014 | Zhu | G06F 11/0703 |
| | | | | 702/185 |
| 2014/0244552 | A1* | 8/2014 | Liu | E21B 47/008 |
| | | | | 706/12 |
| 2015/0269857 | A1* | 9/2015 | Feng | G10L 25/00 |
| | | | | 434/353 |
| 2015/0286712 | A1* | 10/2015 | Donndelinger | G06F 16/288 |
| | | | | 707/701 |
| 2015/0347923 | A1* | 12/2015 | Bartley | G06F 11/079 |
| | | | | 706/12 |
| 2016/0225372 | A1* | 8/2016 | Cheung | G10L 15/22 |
| 2017/0052861 | A1* | 2/2017 | Schuermyer | G06F 11/26 |
| 2017/0103074 | A1* | 4/2017 | Wang | G06F 16/24578 |
| 2017/0169325 | A1* | 6/2017 | McCord | G06F 40/205 |
| 2017/0220405 | A1* | 8/2017 | Larsen | G06F 11/0706 |
| 2017/0278421 | A1* | 9/2017 | Du | G09B 7/02 |
| 2017/0300966 | A1* | 10/2017 | Dereszynski | G06Q 30/0254 |
| 2018/0005248 | A1* | 1/2018 | Koutrika | G06Q 30/0631 |
| 2018/0181866 | A1* | 6/2018 | Dalle | G06N 20/00 |
| 2018/0204095 | A1* | 7/2018 | Chillar | G21D 3/04 |
| 2018/0284735 | A1* | 10/2018 | Cella | G05B 23/0264 |
| 2019/0007434 | A1* | 1/2019 | McLane | G06N 3/084 |
| 2019/0079818 | A1* | 3/2019 | Handa | G06F 11/0778 |
| 2019/0121907 | A1* | 4/2019 | Brunn | G06F 16/353 |

* cited by examiner

| Failure Mode ID | Device Model ID | Failure Mode Data |
|---|---|---|
| 1 | 7 | Data 1 |
| 2 | 7 | Data 2 |
| 3 | 7 | Data 3 |
| 4 | 7 | Data 4 |
| 5 | 7 | Data 5 |
| ⋮ | ⋮ | ⋮ |
| k | 7 | Data k |

FIG. 4

| Topic ID | Topic Terms | Failure Mode ID |
|---|---|---|
| 1 | Term A1, Term A2, Term A3 | 4 |
| 2 | Term B1, Term B2 | 3 |
| 3 | Term C1, Term C2 | 1 |
| 4 | Term D1, Term D2, Term D3 | 3 |
| 5 | Term E1 | 2 |
| ⋮ | ⋮ | ⋮ |
| j | Term j1, Term j2 | 5 |

| Notification ID (205) | Device Model ID (210) | Text (215) | Topic ID (220) |
|---|---|---|---|
| 1 | 7 | Text 1 | 3 |
| 2 | 7 | Text 2 | 2 |
| 3 | 7 | Text 3 | 5 |
| 4 | 7 | Text 4 | 1 |
| 5 | 7 | Text 5 | 4 |
| ... | ... | ... | ... |
| m | 7 | Text m | 3 |

| Notification ID (205) | Device Model ID (210) | Text (215) | Topic ID (220) | Failure Mode ID (225) |
|---|---|---|---|---|
| 1 | 7 | Text 1 | 3 | 1 |
| 2 | 7 | Text 2 | 2 | 3 |
| 3 | 7 | Text 3 | 5 | 2 |
| 4 | 7 | Text 4 | 1 | 4 |
| 5 | 7 | Text 5 | 4 | 3 |
| ... | ... | ... | ... | ... |
| m | 7 | Text m | 3 | 1 |

FIG. 7

DETERMINING FAILURE MODES OF DEVICES BASED ON TEXT ANALYSIS

BACKGROUND

In many types of systems (e.g., manufacturing systems, production systems, etc.), maintenance costs may constitute a major part of the total operating costs. Generally, the aim of an optimal maintenance policy is to provide optimal machine and/or plant availability, reliability, and safety at the lowest possible cost. Different systems may use any number of different failure identification procedures. Examples of such procedures include failure mode effects analysis (FMEA) procedures; failure mode, effects and criticality analysis (FMECA) procedures; fault tree analysis (FTA) procedures; etc. In some instances, failure identification procedures and design of experiments are being used for quality control and for the detection of potential failure modes during the detail design stage and/or the post product launch stage.

SUMMARY

In some embodiments, a non-transitory machine-readable medium stores a program. The program retrieves a set of notifications. Each notification includes a set of words describing a failure that occurred on a monitored device in a set of monitored devices. The program further determines a set of topics based on the sets of words of the set of notifications. For each topic in the set of topics, the program also determines a failure mode associated with the topic from a plurality of failure modes defined for the set of monitored devices. For each notification in the set of notifications, the program further determines a failure mode associated with the notification based on the set of topics and the failure modes associated with the set of topics. The program also receives a particular notification that includes a particular set of words describing a failure that occurred on a particular monitored device in the set of monitored devices. The program further determines a failure mode associated with the particular notification based on the particular set of words and the determined failure modes associated with the set of notifications.

In some embodiments, a topic in the set of topics may include a set of related words or phrases that occur in the set of words of the set of notifications. Determining the set of topics may be further based on a Latent Dirichlet allocation (LDA) model. Determining, for each topic in the set of topics, the failure mode associated with the topic from the plurality of failure modes defined for the set of monitored devices may be based on a Latent Dirichlet allocation (LDA) model.

In some embodiments, determining, for each notification in the set of notifications, the failure mode associated with the notification may include determining a topic in the set of topics associated with the notification and determining the failure mode associated with the notification based on the failure modes associated with the set of topics. Determining, for each notification in the set of notifications, the topic in the set of topics associated with the notification may be based on a Latent Dirichlet allocation (LDA) model. Determining, for each topic in the set of topics, the failure mode associated with the topic from the plurality of failure modes defined for the set of monitored devices may include determining a device model associated with the set of monitored devices, determining that the plurality of failure mode definitions are defined for the device model, and retrieving the plurality of failure modes from a storage configured to store failure mode definitions.

In some embodiments, a method retrieves a set of notifications. Each notification includes a set of words describing a failure that occurred on a monitored device in a set of monitored devices. The method further determines a set of topics based on the sets of words of the set of notifications. For each topic in the set of topics, the method also determines a failure mode associated with the topic from a plurality of failure modes defined for the set of monitored devices. For each notification in the set of notifications, the method further determines a failure mode associated with the notification based on the set of topics and the failure modes associated with the set of topics. The method also receives a particular notification comprising a particular set of words describing a failure that occurred on a particular monitored device in the set of monitored devices. The method further determines a failure mode associated with the particular notification based on the particular set of words and the determined failure modes associated with the set of notifications.

In some embodiments, a topic in the set of topics may include a set of related words or phrases that occur in the set of words of the set of notifications. Determining the set of topics may be further based on a Latent Dirichlet allocation (LDA) model. Determining, for each topic in the set of topics, the failure mode associated with the topic from the plurality of failure modes defined for the set of monitored devices may be based on a Latent Dirichlet allocation (LDA) model.

In some embodiments, determining, for each notification in the set of notifications, the failure mode associated with the notification may include determining a topic in the set of topics associated with the notification and determining the failure mode associated with the notification based on the failure modes associated with the set of topics. Determining, for each notification in the set of notifications, the topic in the set of topics associated with the notification may be based on a Latent Dirichlet allocation (LDA) model. Determining, for each topic in the set of topics, the failure mode associated with the topic from the plurality of failure modes defined for the set of monitored devices may include determining a device model associated with the set of monitored devices, determining that the plurality of failure mode definitions are defined for the device model, and retrieving the plurality of failure modes from a storage configured to store failure mode definitions.

In some embodiments, a system includes a set of processing units and a non-transitory machine-readable medium that stores instructions. The instructions cause at least one processing unit to retrieve a set of notifications. Each notification includes a set of words describing a failure that occurred on a monitored device in a set of monitored devices. The instructions further cause the at least one processing unit to determine a set of topics based on the sets of words of the set of notifications. For each topic in the set of topics, The instructions also cause the at least one processing unit to determine a failure mode associated with the topic from a plurality of failure modes defined for the set of monitored devices. For each notification in the set of notifications, The instructions further cause the at least one processing unit to determine a failure mode associated with the notification based on the set of topics and the failure modes associated with the set of topics. The instructions also cause the at least one processing unit to receive a particular notification comprising a particular set of words describing a failure that occurred on a particular monitored device in the set of monitored devices. The instructions further cause the at least one processing unit to determine a failure mode associated with the particular notification based on the particular set of words and the determined failure modes associated with the set of notifications.

In some embodiments, a topic in the set of topics may include a set of related words or phrases that occur in the set of words of the set of notifications. Determining the set of topics may be further based on a Latent Dirichlet allocation (LDA) model. Determining, for each topic in the set of topics, the failure mode associated with the topic from the plurality of failure modes defined for the set of monitored devices may be based on a Latent Dirichlet allocation (LDA) model.

In some embodiments, determining, for each notification in the set of notifications, the failure mode associated with the notification may include determining a topic in the set of topics associated with the notification and determining the failure mode associated with the notification based on the failure modes associated with the set of topics. Determining, for each notification in the set of notifications, the topic in the set of topics associated with the notification may be based on a Latent Dirichlet allocation (LDA) model.

The following detailed description and accompanying drawings provide a better understanding of the nature and advantages of the present invention.

BRIEF DESCRIPTION OF THE DRAWINGS

FIG. 4 illustrates an example table of failure mode definition data according to some embodiments.

FIG. 5 illustrates failure mode definition data associated with the topic data illustrated in FIG. 3 according to some embodiments.

FIG. 6 illustrates topic data associated with the device failure data illustrated in FIG. 2 according to some embodiments.

FIG. 7 illustrates failure mode definition data associated with the device failure data illustrated in FIG. 6 according to some embodiments.

DETAILED DESCRIPTION

Figure 1:
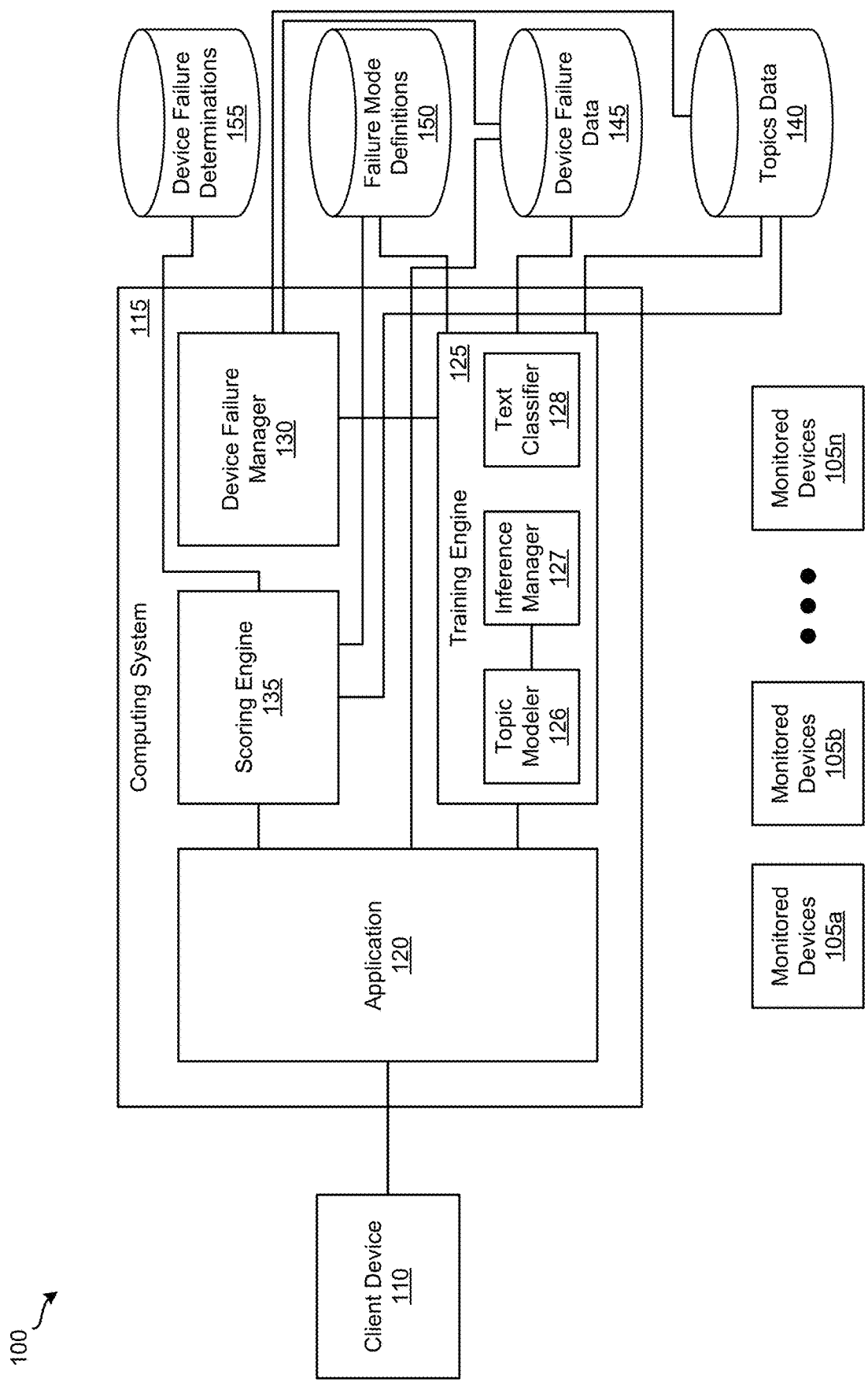
FIG. 1 illustrates a system for determining failure modes of devices according to some embodiments.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Described herein are techniques for determining failure modes of devices based on text analysis. In some embodiments, a system utilizes a two-stage data training approach to determining failure modes of devices. In the first data training stage (also referred to as an unsupervised training stage), the system may retrieve and analyze text or documents describing failures that have occurred on devices. Such text may be in the form of notifications, messages, logs, etc., that a user provides to the system when the user is determining the cause of the failures of the devices. Based on the analysis of the text, the system may determine one or more topics using a topic model. In some embodiments, a topic specifies a group of related terms (e.g., words, phrases, etc.) or clusters of similar terms that occur in the text. In some embodiments, a topic model captures this intuition in a mathematical framework, which allows examining a set of documents and discovering based on statistics of the terms in each document, what the topics might be and what each document's balance of such a topic might be. The system may then retrieve failure mode definitions and determine, for with each topic, a failure mode defined in the failure mode definitions that is associated with the topic. The system can infer underlying topics that explain a specific instance of text based on the generative process which was used to train the model. In some cases, this is achieved by inferring the conditional distribution (posterior) of the hidden variables given the observed variables. In other words, the underlying topic distribution that coherently explains the specific failure mode is determined based on the generative process that was used to train the model.

In the first data training stage, the system may determine, for each instance of text (e.g., the text of a notification, a text of a message, a text of a log, etc.) used to determine the one or more topics described above, a topic that is associated with the instance of text. Next, the system may determine, by inference, a failure mode, for each instance of text, that is associated with the instance of text based on the analysis of the text mentioned above. Once the first data training stage is complete, the system may use the data generated from the first data training stage to curate a labeled dataset of notification texts and failure modes as labels, which is then used for a second supervised training stage. The second training stage includes the usage of text classification techniques in order learn a model that determines categories or labels for documents. By means of scoring on the learnt classification model, the system determines failure modes that are associated with any new notifications, messages, logs, etc. received by the system that have text describing failures that have occurred on devices.

In some embodiments, the system uses a Latent Dirichlet allocation (LDA) model for various aspects of data training. Latent Dirichlet Allocation (LDA) model may be a Bayesian mixture model for discrete data where topics are assumed to be uncorrelated. LDA assumes that each document can be represented as a probabilistic distribution over latent topics, and that topic distribution in all documents share a common Dirichlet prior. Each latent topic in the LDA model can be represented as a probabilistic distribution over words and the word distributions of topics share a common Dirichlet prior as well.

The techniques described in the present application provide a number of benefits and advantages over conventional data processing systems. For example, a system that uses a two stage data training approach can improve the accuracy of failure modes determined to be associated with device failure data received by the system that have text describing failures that have occurred on devices. Additionally, such a system provides an automated approach to failure mode identification based on information embedded in texts, thereby enabling faster processing of notifications and aiding in root cause analysis.

FIG. 1 illustrates a system 100 for determining failure modes of devices according to some embodiments. As shown, system 100 includes monitored devices 105a-n, client device 110, computing system 115, and storages 140-155. Monitored devices 105a-n are devices for which a user of client device 110 provides data to computing system 115. Monitored devices 105a-n may be a standalone device or a component of a device. Monitored devices 105a-n can be mechanical devices, electronic devices, computing devices, wearable devices, machines, tools, gadgets, toys, etc., or any combination thereof. Each of the monitored devices 105a-n can have a device type (e.g., a centrifugal pump, a network router, a smartphone, a refrigerator, etc.). In some embodiments, some or all of the monitored devices 105a-n may be the same device type. In other embodiments, some or all of the monitored devices 105a-n may be the same device model (e.g., some or all of the monitored devices 105a-n are associated with the same device model identifier (ID) or equipment model ID).

Client device 110 is configured to communicate and interact with computing system 115. For example, a user of client device 110 may send computing system 115 data associated with monitored devices 105a-n. The data associated with a monitored device 105 may include text describing failures that have occurred on the monitored device 105. In some cases, a user of client device 110 can provide validation for data generated and/or determined by computing system 115 during various stages of data training. A user of client device 110 may send computing system 115 requests for data associated with monitored devices 105a-n (e.g., device failure data, device failure determinations, device failure modes, etc.).

Topics data storage 140 is configured to store topics determined and generated by topic modeler 126. In some embodiments, a topic specifies a set of related terms (e.g., words, phrases, etc.). Device failure data storage 145 stores device failure data associated with monitored devices 105a-n. Device failure data associated with a monitored device 105 may include text describing failures that have occurred on the monitored device 105. In some embodiments, the text of device failure data associated with a monitored device 105 may be in the form of notifications, messages, logs, etc. Failure mode definitions storage 150 is configured to store failure mode definitions. In some embodiments, a failure mode definition specifies a failure mode for a particular device type or device model. In some such embodiments, a failure mode describes the manner in which a particular device or device model may fail functionally. In some cases (e.g., where monitored devices 105a-n are the same device model), failure mode definitions stored in failure mode definitions storage 150 can be provided by the manufacturer of monitored devices 105a-n. In other cases, failure mode definitions stored in failure mode definitions storage 150 are provided from an industry standard. For example, in petroleum, petrochemical and/or natural gas industries, failure mode definitions can be provided by an International Organization for Standardization (ISO) 14224 standard. Device failure determinations storage 155 stores failure modes determined by notifications processor 135 to be the cause of failures of monitored devices 105a-n. In some embodiments, storages 140-155 are implemented in a single physical storage while, in other embodiments, storages 140-155 may be implemented across several physical storages. While FIG. 1 shows storages 140-155 as external to computing system 115, one of ordinary skill in the art will appreciate that storages 140, 145, 150, and/or 155 may be part of computing system 115 in some embodiments.

As illustrated in FIG. 1, computing system 115 includes application 120, training engine 125, device failure manager 130, and scoring engine 135. Application 120 is configured to communicate and interact with client device 110. For instance, application 120 may receive data associated with a monitored device 105 that includes text describing failures that have occurred on the monitored device 105. In some embodiments, application 120 provides client device 110 a graphical user interface (GUI) through which a user of client device 110 can provide the data. In response to receiving the data, application 120 can store the data associated with the monitored device 105 in device failure data storage 145. In some instances, application 120 also sends the data associated with the monitored device 105 to scoring engine 135. In some embodiments, application 120 may provide a GUI through which a user of client device 110 can validate data generated and/or determined by computer system 115 during various stages of data training. Application 120 may receive requests from client device 110 for data associated with monitored devices 105a-n (e.g., device failure data, device failure determinations, device failure modes, etc.). In response, application 120 can provide the requested data to client device 110 (e.g., via a GUI). For example, application 120 can receive a request from client device 110 for determined failure modes for failures described in new notifications, messages, logs, etc. In response to such a request, application 120 may send scoring engine 135 a request for such data. Once application 120 receives the data from scoring engine 135, application 120 provides the determined failure modes for such failures to client device 110 (e.g., via a GUI).

As shown, training engine 125 includes topic modeler 126, inference manager 127, and text classifier 128. Topic modeler 126 is responsible for initiating the first data training stage. In some cases, topic modeler 126 initiates the first stage at defined intervals (e.g., once a day, once a week, once a month, etc.). In other cases, topic modeler 126 initiates the first stage in response to a request to start data training (e.g., from a user of client device 105). In the first stage of data training, topic modeler 126 may determine a set of topics based on device failure data. In some embodiments, topic modeler 126 determines the set of topics by retrieving from device failure data storage 145 device failure data associated with monitored devices 105a-n that include text describing failures that have occurred on monitored devices 105a-n. In some such embodiments, topic modeler 126 retrieves device failure data associated with monitored devices 105a-n from device failure data storage 145 that is from a defined period of time (e.g., device failure data associated with monitored devices 105a-n describing failures that occurred within the last six months, one year, two years, etc.).

Next, topic modeler 126 employs a Latent Dirichlet allocation (LDA) model to determine the set of topics based on all the text from the retrieved device failure data associated with monitored devices 105a-n. In some embodiments, topic modeler 126 first determines the number of topics to in the set of topics. To determine the optimum number of topics, topic modeler 126 may determine the mean probabilistic semantic coherence of different numbers of inferred topics based on all the text by running multiple LDA models against the retrieved device failure data associated with monitored devices 105a-n. Topic modeler 126 can then select the LDA model having the highest mean probabilistic coherence. The number of topics used to generate this model is then chosen as the optimum number of topics. The coherence score is the mean pairwise Cosine similarity between the vectors corresponding to the top terms describing the topic.

In some embodiments, the system utilizes the following equation (1) to determine the coherence of a topic:

$$C(t_i V^{(t)}) = \sum_{m=2}^{M} \sum_{l=1}^{m-1} \log \frac{D(v_m^{(t)}, v_l^{(t)})}{D(v_l^{(t)})}$$

where D(v) is the document frequency of word v (i.e., the number of documents with least one token of type v) and $V^{(t)}=(v_1^{(t)}, \ldots, v_m^{(t)})$ is the list of the M most probable words in topic t. This metric, which relies upon word co-occurrence statistics gathered from the corpus being modeled rather than an external reference corpus, is both domain-specific, and does not require additional reference data.

Once topic modeler 126 determines the number of topics in the set of topics, topic modeler 126 uses the LDA model to determine the set of topics based on all the text from the retrieved device failure data associated with monitored devices 105a-n. In some embodiments, the LDA model utilizes the following equation (2) to determine the set of topics:

$$P(\eta \mid \alpha, \beta) = \prod_{d=1}^{M} \int p(\theta_d \mid \alpha) \left( \prod_{n=1}^{N_d} \sum_{Z_{dn}} p(\pi_{dn} \mid \theta_d) p(w_{dn} \mid \pi_{dn}, \beta) \right) d\theta_d$$

where α and β are corpus-level parameters (e.g., topic-level parameters) sampled once in the process of generating a topic. A corpus is a collection of M documents denoted by $D=\{w_1, w_2, \ldots, w_{dn}\}$. $\theta_d$ are document-level variables (e.g., notification-level, message-level, log-level, etc. parameters) that are sampled once per document. $N_d$ are N topics in single documents d. Variables $z_{dn}$ and $w_{dn}$ are word-level variables that are sampled once for each word in each document.

As mentioned above, a topic specifies a group of related terms (e.g., words, phrases, etc.) in some embodiments. Here, each term in the group of related terms of a topic determined by topic modeler 126 occurs in the text from the device failure data associated with monitored devices 105a-n. That is, each term in the group of related terms of a topic occurs in at least one notification, message, log, etc. (but not necessarily every notification, message, log, etc.) in the retrieved device failure data associated with monitored devices 105a-n. In some embodiments, each topic determined by topic modeler 126 is a distribution of words in the text from the device failure data associated with monitored devices 105a-n. Once topic modeler 126 determines the set of topics, topic modeler 126 stores them in topics data 140.

After topic modeler 126 determines the set of topics, inference manager 127 retrieves from failure mode definitions storage 150 failure mode definitions defined for monitored devices 105a-n. Inference manager 127 can then determine, for each topic in the set of topics, a failure mode from the retrieved failure mode definitions that is associated with the topic. In some embodiments, inference manager 127 determines a failure mode from the retrieved failure mode definitions that is associated with a topic by determining the similarity between the topic and each failure mode and then selecting the failure mode having the highest similarity with the topic to be associated with the topic. Determining the similarity between a topic and a failure mode may be referred to as computing the distances between the topic and the failure modes. In some instances, inference manager 127 determines the similarity between a topic and a failure mode by computing the posterior prior probability between the topic and the failure mode. In other instances, inference manager 127 determines the similarity between a topic and a failure mode by computing the cosine similarities between the topic and the failure mode. In some embodiments, inference manager 127 uses an LDA model to determine a failure mode for a topic. For example, inference manager 127 may infer the conditional distribution (posterior) of the hidden variables given the observed variables from the learned LDA Model. One approach is to use the following equation (3) to determine a topic distribution for failure mode using collapsed Gibbs Sampler:

$$p(w \mid \alpha, \beta) = \frac{\Gamma(\Sigma_t \alpha_t)}{\Pi_t \delta(\alpha_t)} \int \left( \prod_{t=1}^{k} \theta_t^{\alpha_t - 1} \right) \left( \prod_{n=1}^{N} \sum_{t=1}^{k} \prod_{j=1}^{V} (\theta_t \beta_{ij})^{w_n^j} \right) d\theta$$

where p(w) represents the posterior distribution of the hidden variables, given a document, given α and β, the corpus-level parameter. $\theta_i$ are document-level variables representing distribution of topics in document. k is the number of topics, V is the number of words in the vocabulary. $w_n^t$ is the identity of jth word in nth document. Once inference manager 127 determines a failure mode for each topic in the set of topics, inference manager 127 stores the determinations in topics storage 140 and sends device failure manager 130 a notification that training engine 125 has completed the first stage of data training. In some embodiments, inference manager 127 sends application 120 a request to present the determinations to client device 110 in order to allow a user of client device 110 to validate the determinations made by topics training engine 125.

Device failure manager 130 handles the second data training stage. Upon receiving a notification from training engine 125 that training engine 125 has completed the first stage of data training, device failure manager 130 starts the second data training stage by retrieving device failure data from device failure data storage 145 that is associated with monitored devices 105a-n. In some embodiments, device failure manager 130 retrieves the same device failure data from device failure data storage 145 that was used by training engine 125 in the first stage of the data training. Next, device failure manager 130 retrieves the set of topics determined by topics engine 125 from topics data storage 140. The retrieved device failure data and the retrieved set of topics can constitute an input training dataset of labeled failure data.

Device failure manager 130 is now able to join the topics per device failure in topics storage data 140 determined by topic modeler 126 during the unsupervised topic modeling, with the topics per failure mode in topics data storage 140 determined by inference manager 127 during the inference operations. Device failure manager 130 now can prepare the input training dataset for the second stage of training. Device failure manager 130 thus determines a failure mode that is associated with each notification, message, log, etc. in the retrieved device failure data based on the set of topics and failure modes associated with the set of topics determined in the first stage of the data training. In some embodiments, device failure manager 130 determines a failure mode that is associated with a notification by determining a topic in the set of topics that is associated with the notification and then determining the failure mode that is associated with the notification based on the failure modes associated with the set of topics that topic modeler 126 determined in the first stage of the data training. In some such embodiments, device failure manager 130 uses an LDA model to determine a topic associated with a notification. After device failure manager 130 determines a failure mode that is associated with each notification, message, log, etc. in the retrieved device failure data, device failure manager 130 stores the determinations in device failure data storage 145.

Text classifier 127 uses failure data that have text describing failures that have occurred on monitored devices 105a-n and known failure modes in order to perform the second stage of training. Classification technique training is a type of machine learning technique where a training set of correctly identified observations is available. In some embodiments, this dataset is also termed as labeled dataset, implying category assignment of each record of the data is known. The objective of the classification algorithm is then to learn classifiers from the known examples, so that category assignment can be automatically done for a new example, for which category assignment is unknown. In some systems, the simplest form of text classification, uses the concept of building features using a bag of words model, where the classifier would learn the presence of words in a text. Content-based classification is classification in which the weight given to particular subjects in a document determines the class to which the document is assigned. A common methodology used to do this is TF-IDF (term frequency—inverse document frequency). The TF-IDF weighting for a word increases with the number of times the word appears in the document but decreases based on how frequently the word appears in the entire document set. This can be mathematically represented via the following equation (4):

$$TFIDF(i, j) = TF(i, j) \cdot IDF(t, j)$$

$$IDF(t) = \log \frac{N}{DF(t)}$$

where TF(i,j) means how many times does the $i^{th}$ word occurs in the $j^{th}$ document, N is the number of documents, and DF(i) counts the documents containing the $i^{th}$ word at least once. The transformed documents now form the document term matrix. After pre-processing and transformations, a machine learning algorithm is used for learning how to classify documents, i.e. creating a model for input-output mappings. Several classification models can be used for the classification. However, linear models such as Support Vector Machines, Logistic Regression are expressive enough to achieve good results.

Support Vector Machine (SVM) is primarily a classier method that performs classification tasks by constructing hyperplanes in a multidimensional space that separates cases of different class labels. SVM searches for a separating hyperplane, which separates positive and negative examples from each other with maximal margin. Such a hyperplane can be expressed via the following equation (5):

$$w^T x + b = 0$$

where $w^T$ is the decision hyperplane normal vector, x is the datapoint in the training example, y is the class of the data point, b is a scalar value representing the intercept. Text classifier 128 learns the optimal hyperplane which separates one class from the rest of the classes. The one-versus-rest (1VR) approach constructs k separate binary classifiers for k-class classification. For example, for monitored device 105, K classes here are represented by the total number of failure mode definitions storage 150 failure mode definitions defined for the monitored device 105.

Scoring is also called prediction, and is the process of generating values based on a trained machine learning model, given some new input data. The values or scores that are created can represent predictions of future values, but they might also represent a likely category or outcome. In some embodiments, scoring refers to predicting the most likely failure mode assignment for incoming device failure data based on the model that is trained by text classifier engine 128.

Scoring engine 135 applies the trained models learnt via text classifier 128 in order to determine failure modes that are associated with incoming device failure data (e.g., notifications, message, logs, etc.) that have text describing failures that have occurred on monitored devices 105a-n. For example, scoring engine 135 may receive from application 120 an instance (e.g., a notification, a message, a log, etc.) of device failure data that has text describing a failure that has occurred on a monitored device 105. In response, scoring engine 135 applies the model that has been trained by training engine 125c, which has learnt a classifier that has determined the failure mode from failure mode definitions defined for the monitored device 105 stored in failure mode definitions storage 150. Next, scoring engine 135 stores the instance of device failure data and the determination in device failure determinations storage 155. In some instances, scoring engine 135 may receive from application 120 a request for determined failure modes for failures described in new notifications, messages, logs, etc. In response to such a request, scoring engine 135 retrieves the requested data from device failure determinations storage 155 and sends it to application 120.

Classification via support vector machines (svm) of an unseen test example x is based on the sign of $w^T x + b$. The separator property can be formalized via the following equation (6):

$$w^T x_t + b \geq 1 \text{ tffy}_i = +1$$

$$w^T x_t + b \leq 1 \text{ tffy}_i = -1$$

where $w^T$ is the decision hyperplane normal vector, $x_i$ is the $i^{th}$ datapoint, $y_i$ is the class of the $i^{th}$ data point, b is a scalar value representing the intercept.

An example operation of system 100 will now be described by reference to FIGS. 2-7. For this operation, a user of client device 110 has provided device failure data (e.g., notifications, messages, logs, etc.) associated with monitored devices 105a-n that include text describing failures that have occurred on monitored devices 105a-n. The example operation starts when topic modeler 126 initiates the first data training stage by retrieving from device failure data storage 145 device failure data associated with monitored devices 105a-n that include text describing failures that have occurred on monitored devices 105a-n. As described above, some or all of the monitored devices 105a-n may be the same device model. For this example, all of the monitored devices 105a-n are the same device model. As such, the device failure data that topic modeler 126 retrieves from device failure data storage 145 is device failure data for the same device model.

Figure 2:
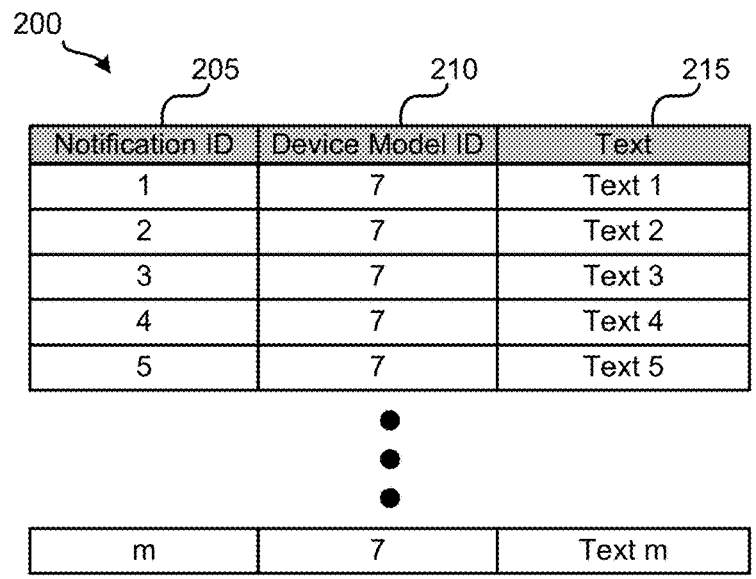
FIG. 2 illustrates an example table of device failure data according to some embodiments.

FIG. 2 illustrates an example table 200 of device failure data according to some embodiments. In this example, table 200 is stored in device failure data storage 145. As shown, table 200 includes m rows of data. Each row of data corresponds to a notification and includes data in columns 205-215. Column 205 is configured to store a notification ID for uniquely identifying the notification. Column 210 is configured to store a device model ID that represents a particular device model associated with the notification. As mentioned above, for this example, all of the monitored devices 105*a-n* are the same device model. Thus, the value stored in each row of column 210 is the same. Column 215 is configured to store text. In this example, the text stored in column 215 describes a failure that occurred on a monitored device 105*a-n*.

Continuing with the example operation, topic modeler 126 uses an LDA model to determine a set of topics based on all the text from the retrieved device failure data associated with monitored devices 105*a-n*. In some embodiments, the LDA model may determine the number of topics in the set of topics by determining the mean probabilistic coherence of different numbers of topics based on all the text from the retrieved device failure data associated with monitored devices 105*a-n* using equation (1) and then selecting the number of topics having the highest mean probabilistic coherence as the number of topics. Then topic modeler 126 uses the equation (2) describe above to determine the set of topics and then stores the set of topics in topics data storage 145.

Figure 3:
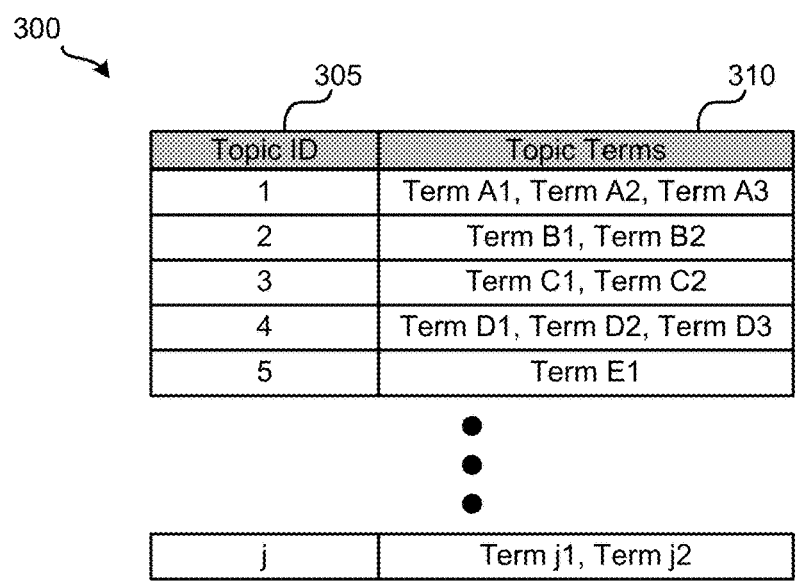
FIG. 3 illustrates an example table of topic data according to some embodiments.

FIG. 3 illustrates an example table 300 of topic data according to some embodiments. For this example, table 300 is stored in topics data storage 140. As shown, table 300 includes j rows of data. Each row of data corresponds to a topic and includes data in columns 305 and 310. Column 305 is configured to store a topic ID for uniquely identifying the topic. Column 310 is configured to store a list of related terms. As explained above, a topic specifies a group of related terms (e.g., words, phrases, etc.) in some embodiments. In this example, each term in column 310 for a particular topic occurs in at least one of Text 1-*m* in table 200. As illustrated in FIG. 3, some topics have the same number of terms while some topics have a different number of terms.

After determining the set of topics, inference manager 127 then retrieves from failure mode definitions storage 150 failure mode definitions defined for monitored devices 105*a-n*. FIG. 4 illustrates an example table 400 of failure mode definition data according to some embodiments. In this example, table 400 is stored in failure mode definitions storage 150. As shown, table 400 includes k rows of data. Each row of data corresponds to a failure mode definition and includes data in columns 405-415. Column 405 is configured to store a failure mode ID for uniquely identifying the failure mode. Column 410 is configured to store a device model ID that represents a particular device model for which the failure mode is defined. For the purposes of simplicity and explanation, table 400 includes failure mode definitions for a particular device model (a device model with a device model ID of 7 in this example). However, one of ordinary skill in the art will understand that failure mode definitions for other device models may also be included in table 400. Column 415 is configured to store failure mode data associated with the failure mode definition. In some embodiments, failure mode data associated with a failure mode definition may include a title for the failure mode definition, text describing causes of the failure mode, an operational mode in which the failure mode occurs, text describing effects of the failure mode, text describing methods for detecting the failure mode, text describing compensating provisions of the failure mode, a severity level of the failure mode, and any action items for the failure mode. One of ordinary skill in the art will appreciate that additional and/or different data may be included in the failure mode data for a failure mode definition.

Next, inference manager 127 determines, for each topic in the set of topics, a failure mode from the retrieved failure mode definitions that is associated with the topic. As described above, inference manager 127 can determine a failure mode from the retrieved failure mode definitions that is associated with a topic by either determining the similarity between the topic and each failure mode and then selecting the failure mode having the highest similarity with the topic to be associated with the topic or determining the similarity between a topic and a failure mode by computing the posterior prior probability between the topic and the failure mode. In this example, inference manager 128 uses inference based on a trained LDA model learnt by topic modeler 126 to determine a failure mode for a topic according to equation (2) described above. After determining a failure mode for each topic in the set of topics, inference manager 127 stores the determinations in topics storage 140 and sends device failure manager 130 a notification that training engine 125 has completed the first stage of data training.

FIG. 5 illustrates failure mode definition data associated with the topic data illustrated in FIG. 3 according to some embodiments. As shown, table 300 includes further includes column 315 for the j rows of data. Column 315 is configured to store a failure mode ID that corresponds to a failure mode definition in table 400. For this example, inference manager 127 has determined that failure mode 4 is associated with topic 1, failure mode 3 is associated with topic 2, failure mode 1 is associated with topic 3, failure mode 3 is associated with topic 4, failure mode 2 is associated with topic 5, . . . , and failure mode 5 is associated with topic j.

When device failure manager 130 receives the notification from training engine 125 that training engine 125 has completed the first stage of data training, device failure manager 130 starts the second data training stage. To start the second data training stage, device failure manager 130 retrieves from device failure data storage 145 the same device failure data from device failure data storage 145 that was used by training engine 125 in the first stage of the data training. In this example, device failure manager 130 table 200. Device failure manager 130 then retrieves the set of topics determined by topics engine 125 from topics data storage 140. For this example, the set of topics that device failure manager 130 retrieves is the data illustrated in table 300 of FIG. 5.

Next, device failure manager 130 determines a failure mode that is associated with each notification, message, log, etc. in the retrieved device failure data based on the set of topics and failure modes associated with the set of topics determined by training engine 125. For this example, device failure manager 130 determines a failure mode that is associated with a notification by using an LDA model to determine a topic in the set of topics that is associated with the notification. FIG. 6 illustrates topic data associated with the device failure data illustrated in FIG. 2 according to some embodiments. Specifically, FIG. 6 illustrates table 200 after device failure manager 130 determines a topic in the set of topics shown in table 300 of FIG. 3 that is associated with each notification in table 200 of FIG. 2. As shown in FIG.

6, device failure manager 130 has determined that topic 3 is associated with notification 1, topic 2 is associated with notification 2, topic 5 is associated with notification 3, topic 1 is associated with notification 4, topic 4 is associated with notification 5, . . . , and topic 3 is associated with notification m.

After determining a topic in the set of topics that is associated with each notification, device failure manager 130 determines a failure mode that is associated with each notification based on the failure modes associated with the set of topics that inference manager 127 determined in the first stage of the data training. For this example, device failure manager 130 determines a failure mode that is associated with each notification based on the data illustrated in table 300 of FIG. 5. FIG. 7 illustrates failure mode definition data associated with the device failure data illustrated in FIG. 6 according to some embodiments. In particular, FIG. 7 illustrates table 200 after device failure manager 130 determines a failure mode shown in table 400 that is associated with each notification in table 200 of FIG. 6. As shown in FIG. 7, device failure manager 130 has determined that failure mode 1 is associated with notification 1, failure mode 3 is associated with notification 2, failure mode 2 is associated with notification 3, failure mode 4 is associated with notification 4, failure mode 3 is associated with notification 5, . . . , and failure mode 1 is associated with notification m. Once device failure manager 130 makes the determinations illustrated in table 200 of FIG. 7, device failure manager 130 stores the determinations in device failure data storage 145. The dataset thus seen in FIG. 7 is then used as input data for applying text classification during the second stage of training by text classifier 128.

Once the two stages of data training are complete, computing system 115 can process new device failure data (e.g., notifications, messages, logs, etc.) that have text describing failures that have occurred on monitored devices 105*a-n*. For instance, a user of client device 110 may send application 110 an instance (e.g., a notification, a message, a log, etc.) of device failure data that has text describing a failure that has occurred on a monitored device 105. Application 120 can store the instance of device failure data in device failure mode data storage 145 and then forward the instance of device failure data to scoring engine 135 for processing. Upon receiving the instance of device failure data describing a failure that has occurred on a monitored device 105, scoring engine 135 retrieves the trained model from topics data storage 140. Then, scoring engine 135 can determine, based on the retrieved failure mode definitions and trained data, a failure mode that is associated with the instance of device failure data in the same manner described above. After determining the failure mode, scoring engine 135 stores the instance of device failure data along with the determination in device failure determinations storage 155.

Figure 8:
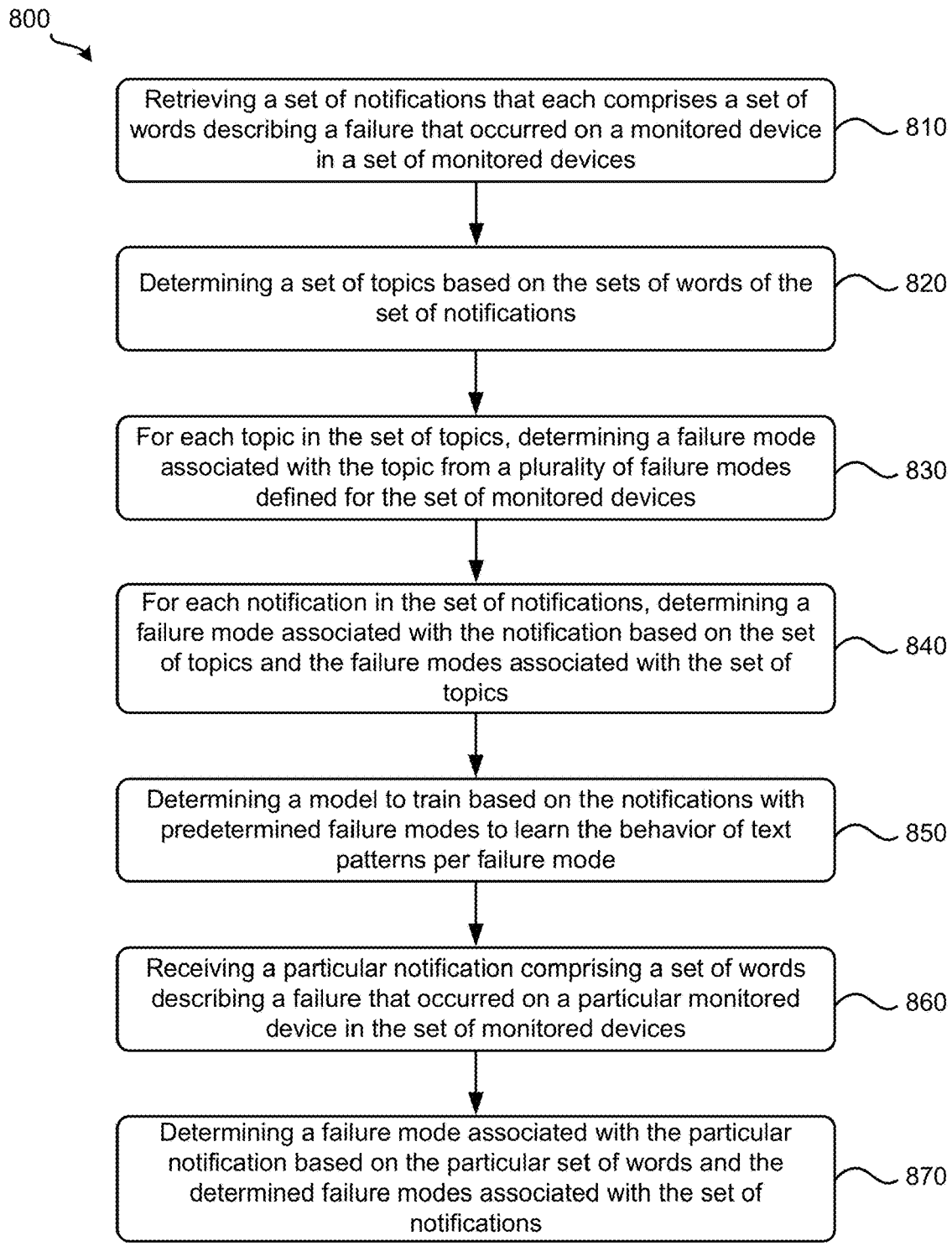
FIG. 8 illustrates a process for determining failure modes of devices according to some embodiments.

FIG. 8 illustrates a process 800 for determining failure modes of devices according to some embodiments. In some embodiments, computing system 115 performs process 800. Process 800 begins by retrieving, at 810, a set of notifications that each comprises a set of words describing a failure that occurred on a monitored device in a set of monitored devices. In some embodiments, process 800 performs operation 810 at the start of the first data training stage. Referring to FIGS. 1 and 2 as an example, topic modeler 126 may retrieve the data shown in table 200 of FIG. 2, which includes text describing failures that occurred on the set of monitored devices 105*a-n*.

Next, process 800 determines, at 820, a set of topics based on the sets of words of the set of notifications. In some embodiments, process 800 performs operation 820 as part of the first data training stage. Referring to FIGS. 1 and 3 as an example, topic modeler 126 may determine the topics shown in table 300 of FIG. 3 based on the data shown in table 200 of FIG. 2. Then, for each topic in the set of topics, process 800 determines, at 830, a failure mode associated with the topic from a plurality of failure modes defined for the set of monitored devices. In some embodiments, process 800 performs operation 830 as part of the first data training stage. Referring to FIGS. 1 and 3-5 as an example, inference manager 127 may determine failure modes for the topics shown in table 300 of FIG. 3 based on the failure mode definitions shown in table 400 of FIG. 4. The result of the determinations are illustrated in table 300 of FIG. 5.

For each notification in the set of notifications, process 800 then determines, at 840, a failure mode associated with the notification based on the set of topics and the failure modes associated with the set of topics. In some embodiments, process 800 performs operation 840 as part of the second data training stage. Referring to FIGS. 1 and 5-7 as an example, device failure manager 130 may determine failure modes for the notifications shown in table 200 of FIG. 2 based on the set of topics and the failure modes associated with the set of topics shown in table 300 of FIG. 5. In some embodiments, device failure manager 130 may determine a failure mode for a notification by first determining a topic in the set of topics that is associated with the notification. FIG. 6 illustrates table 200 after device failure manager 130 determines a topic in the set of topics shown in table 300 of FIG. 3 that is associated with each notification in table 200 of FIG. 2. After determining a topic in the set of topics that is associated with each notification, device failure manager 130 can determine a failure mode that is associated with each notification based on the failure modes associated with the set of topics that inference manager 127 determined in the first stage of the data training. FIG. 7 illustrates table 200 after device failure manager 130 determines a failure mode shown in table 400 that is associated with each notification in table 200 of FIG. 6. Next, process 800, trains, at 850, a text classification model using labeled dataset prepared at 840 to learn classifiers from the known examples, so that failure mode assignment can be automatically done for a new notification.

Process 800 then receives, at 860, a particular notification comprising a particular set of words describing a failure that occurred on a particular monitored device in the set of monitored devices. In some embodiments, process 800 performs operation 850 after data training is finished. Referring to FIG. 1 as an example, a user of client device 110 may send application 110 an instance (e.g., a notification, a message, a log, etc.) of device failure data that has text describing a failure that has occurred on a monitored device 105. Application 120 then stores the instance of device failure data in device failure mode data storage 145 and forwards the instance of device failure data to scoring engine 135 for processing.

Finally, process 800 determines, at 870, a failure mode associated with the particular notification based on the particular set of words and the determined failure modes associated with the set of notifications. Referring to FIG. 1 and continuing with the example above, once scoring engine 135 receives the instance of device failure data describing a failure that has occurred on a monitored device 105, scoring engine 135 applies the trained model learnt at 850 and determines a failure mode that is associated with the instance of device failure data. After determining the failure mode, scoring engine 135 may store the instance of device failure data and the determination in device failure determinations storage 155.

Figure 9:
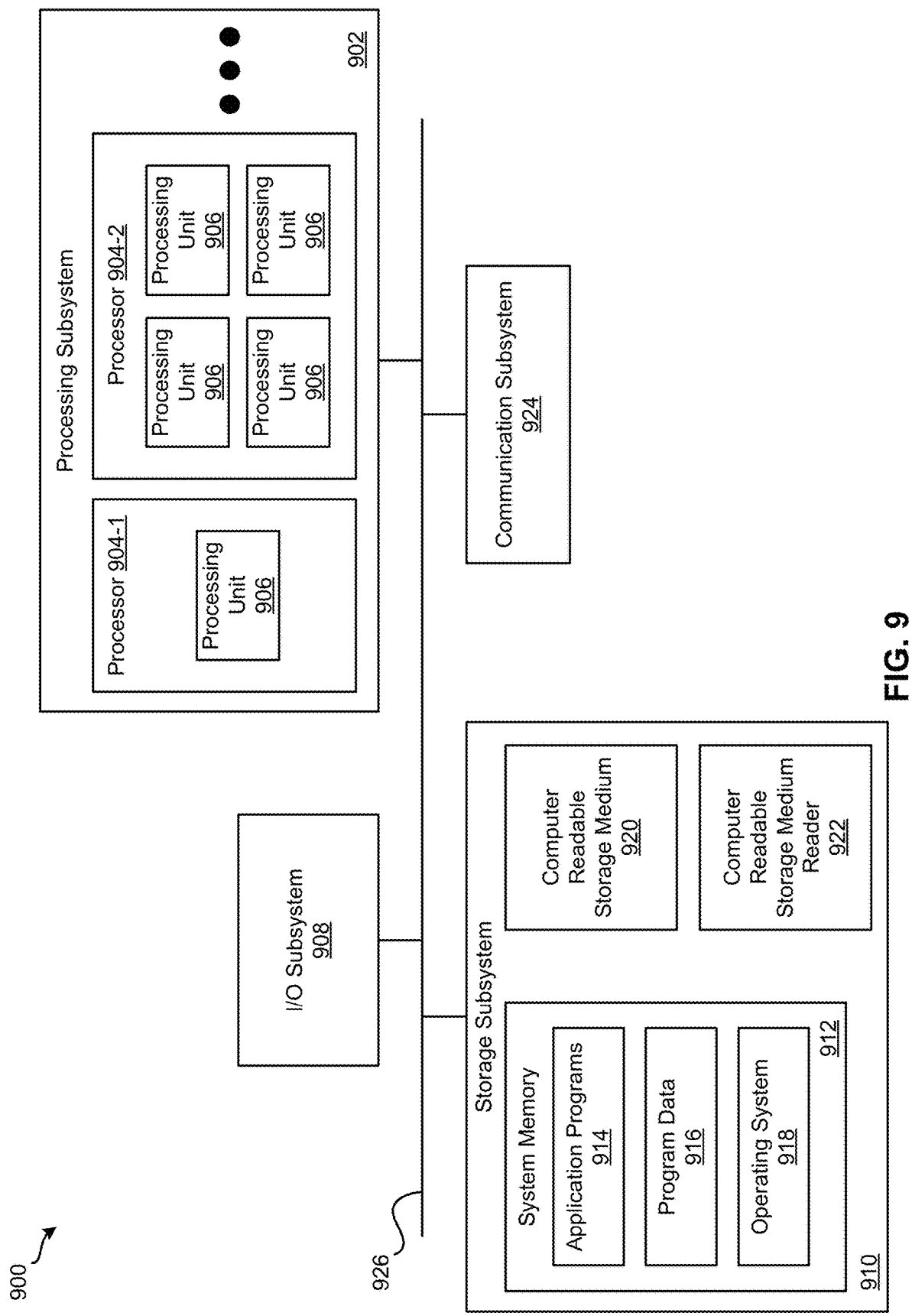
FIG. 9 illustrates an exemplary computer system, in which various embodiments may be implemented.

FIG. 9 illustrates an exemplary computer system 900 for implementing various embodiments described above. For example, computer system 900 may be used to implement monitored devices 105a-n, client device 110, and computing system 115. Computer system 900 may be a desktop computer, a laptop, a server computer, or any other type of computer system or combination thereof. Some or all elements of application 120, training engine 125, device failure manager 130, scoring engine 135, or combinations thereof can be included or implemented in computer system 900. In addition, computer system 900 can implement many of the operations, methods, and/or processes described above (e.g., process 800). As shown in FIG. 9, computer system 900 includes processing subsystem 902, which communicates, via bus subsystem 926, with input/output (I/O) subsystem 908, storage subsystem 910 and communication subsystem 924.

Bus subsystem 926 is configured to facilitate communication among the various components and subsystems of computer system 900. While bus subsystem 926 is illustrated in FIG. 9 as a single bus, one of ordinary skill in the art will understand that bus subsystem 926 may be implemented as multiple buses. Bus subsystem 926 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 902, which can be implemented as one or more integrated circuits (e.g., a conventional microprocessor or microcontroller), controls the operation of computer system 900. Processing subsystem 902 may include one or more processors 904. Each processor 904 may include one processing unit 906 (e.g., a single core processor such as processor 904-1) or several processing units 906 (e.g., a multicore processor such as processor 904-2). In some embodiments, processors 904 of processing subsystem 902 may be implemented as independent processors while, in other embodiments, processors 904 of processing subsystem 902 may be implemented as multiple processors integrate into a single chip or multiple chips. Still, in some embodiments, processors 904 of processing subsystem 902 may be implemented as a combination of independent processors and multiple processors integrated into a single chip or multiple chips.

In some embodiments, processing subsystem 902 can execute a variety of programs or processes in response to program code and can maintain multiple concurrently executing programs or processes. At any given time, some or all of the program code to be executed can reside in processing subsystem 902 and/or in storage subsystem 910. Through suitable programming, processing subsystem 902 can provide various functionalities, such as the functionalities described above by reference to process 800, etc.

I/O subsystem 908 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 900 to a user or another device (e.g., a printer).

As illustrated in FIG. 9, storage subsystem 910 includes system memory 912, computer-readable storage medium 920, and computer-readable storage medium reader 922. System memory 912 may be configured to store software in the form of program instructions that are loadable and executable by processing subsystem 902 as well as data generated during the execution of program instructions. In some embodiments, system memory 912 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 912 may include different types of memory, such as static random access memory (SRAM) and/or dynamic random access memory (DRAM). System memory 912 may include a basic input/output system (BIOS), in some embodiments, that is configured to store basic routines to facilitate transferring information between elements within computer system 900 (e.g., during start-up). Such a BIOS may be stored in ROM (e.g., a ROM chip), flash memory, or any other type of memory that may be configured to store the BIOS.

As shown in FIG. 9, system memory 912 includes application programs 914 (e.g., application 120), program data 916, and operating system (OS) 918. OS 918 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 920 may be a non-transitory computer-readable medium configured to store software (e.g., programs, code modules, data constructs, instructions, etc.). Many of the components (e.g., application 120, training engine 125, device failure manager 130, and scoring engine 135) and/or processes (e.g., process 800) described above may be implemented as software that when executed by a processor or processing unit (e.g., a processor or processing unit of processing subsystem 902) performs the operations of such components and/or processes. Storage subsystem 910 may also store data used for, or generated during, the execution of the software.

Storage subsystem 910 may also include computer-readable storage medium reader 922 that is configured to communicate with computer-readable storage medium 920. Together and, optionally, in combination with system memory 912, computer-readable storage medium 920 may comprehensively represent remote, local, fixed, and/or removable storage devices plus storage media for temporarily and/or more permanently containing, storing, transmitting, and retrieving computer-readable information.

Computer-readable storage medium 920 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 924 serves as an interface for receiving data from, and transmitting data to, other devices, computer systems, and networks. For example, communication subsystem 924 may allow computer system 900 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 924 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 924 may provide components configured for wired communication (e.g., Ethernet) in addition to or instead of components configured for wireless communication.

One of ordinary skill in the art will realize that the architecture shown in FIG. 9 is only an example architecture of computer system 900, and that computer system 900 may have additional or fewer components than shown, or a different configuration of components. The various components shown in FIG. 9 may be implemented in hardware, software, firmware or any combination thereof, including one or more signal processing and/or application specific integrated circuits.

Figure 10:
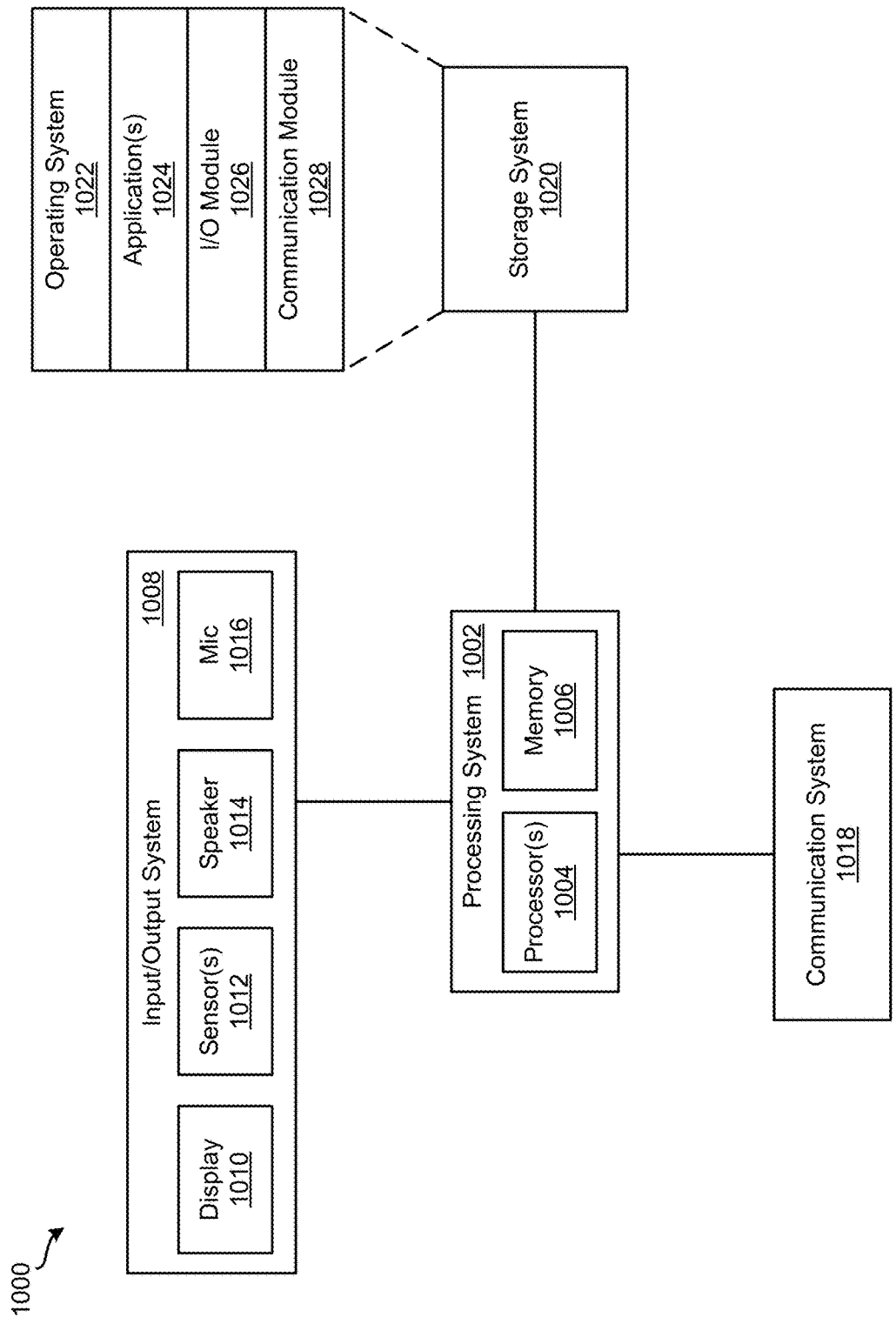
FIG. 10 illustrates an exemplary computing device, in which various embodiments may be implemented.

FIG. 10 illustrates an exemplary computing device 1000 for implementing various embodiments described above. For example, computing device 1000 may be used to implement monitored devices 105a-n and client device 110. Computing device 1000 may be a cellphone, a smartphone, a wearable device, an activity tracker or manager, a tablet, a personal digital assistant (PDA), a media player, or any other type of mobile computing device or combination thereof. As shown in FIG. 10, computing device 1000 includes processing system 1002, input/output (I/O) system 1008, communication system 1018, and storage system 1020. These components may be coupled by one or more communication buses or signal lines.

Processing system 1002, which can be implemented as one or more integrated circuits (e.g., a conventional microprocessor or microcontroller), controls the operation of computing device 1000. As shown, processing system 1002 includes one or more processors 1004 and memory 1006. Processors 1004 are configured to run or execute various software and/or sets of instructions stored in memory 1006 to perform various functions for computing device 1000 and to process data.

Each processor of processors 1004 may include one processing unit (e.g., a single core processor) or several processing units (e.g., a multicore processor). In some embodiments, processors 1004 of processing system 1002 may be implemented as independent processors while, in other embodiments, processors 1004 of processing system 1002 may be implemented as multiple processors integrate into a single chip. Still, in some embodiments, processors 1004 of processing system 1002 may be implemented as a combination of independent processors and multiple processors integrated into a single chip.

Memory 1006 may be configured to receive and store software (e.g., operating system 1022, applications 1024, I/O module 1026, communication module 1028, etc. from storage system 1020) in the form of program instructions that are loadable and executable by processors 1004 as well as data generated during the execution of program instructions. In some embodiments, memory 1006 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1008 is responsible for receiving input through various components and providing output through various components. As shown for this example, I/O system 1008 includes display 1010, one or more sensors 1012, speaker 1014, and microphone 1016. Display 1010 is configured to output visual information (e.g., a graphical user interface (GUI) generated and/or rendered by processors 1004). In some embodiments, display 1010 is a touch screen that is configured to also receive touch-based input. Display 1010 may be implemented using liquid crystal display (LCD) technology, light-emitting diode (LED) technology, organic LED (OLED) technology, organic electro luminescence (OEL) technology, or any other type of display technologies. Sensors 1012 may include any number of different types of sensors for measuring a physical quantity (e.g., temperature, force, pressure, acceleration, orientation, light, radiation, etc.). Speaker 1014 is configured to output audio information and microphone 1016 is configured to receive audio input. One of ordinary skill in the art will appreciate that I/O system 1008 may include any number of additional, fewer, and/or different components. For instance, I/O system 1008 may include a keypad or keyboard for receiving input, a port for transmitting data, receiving data and/or power, and/or communicating with another device or component, an image capture component for capturing photos and/or videos, etc.

Communication system 1018 serves as an interface for receiving data from, and transmitting data to, other devices, computer systems, and networks. For example, communication system 1018 may allow computing device 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1018 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1018 may provide components configured for wired communication (e.g., Ethernet) in addition to or instead of components configured for wireless communication.

Storage system 1020 handles the storage and management of data for computing device 1000. Storage system 1020 may be implemented by one or more non-transitory machine-readable mediums that are configured to store software (e.g., programs, code modules, data constructs, instructions, etc.) and store data used for, or generated during, the execution of the software.

In this example, storage system 1020 includes operating system 1022, one or more applications 1024, I/O module 1026, and communication module 1028. Operating system 1022 includes various procedures, sets of instructions, software components and/or drivers for controlling and managing general system tasks (e.g., memory management, storage device control, power management, etc.) and facilitates communication between various hardware and software components. Operating system 1022 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1024 can include any number of different applications installed on computing device 1000. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1026 manages information received via input components (e.g., display 1010, sensors 1012, and microphone 1016) and information to be outputted via output components (e.g., display 1010 and speaker 1014). Communication module 1028 facilitates communication with other devices via communication system 1018 and includes various software components for handling data received from communication system 1018.

One of ordinary skill in the art will realize that the architecture shown in FIG. 10 is only an example architecture of computing device 1000, and that computing device 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
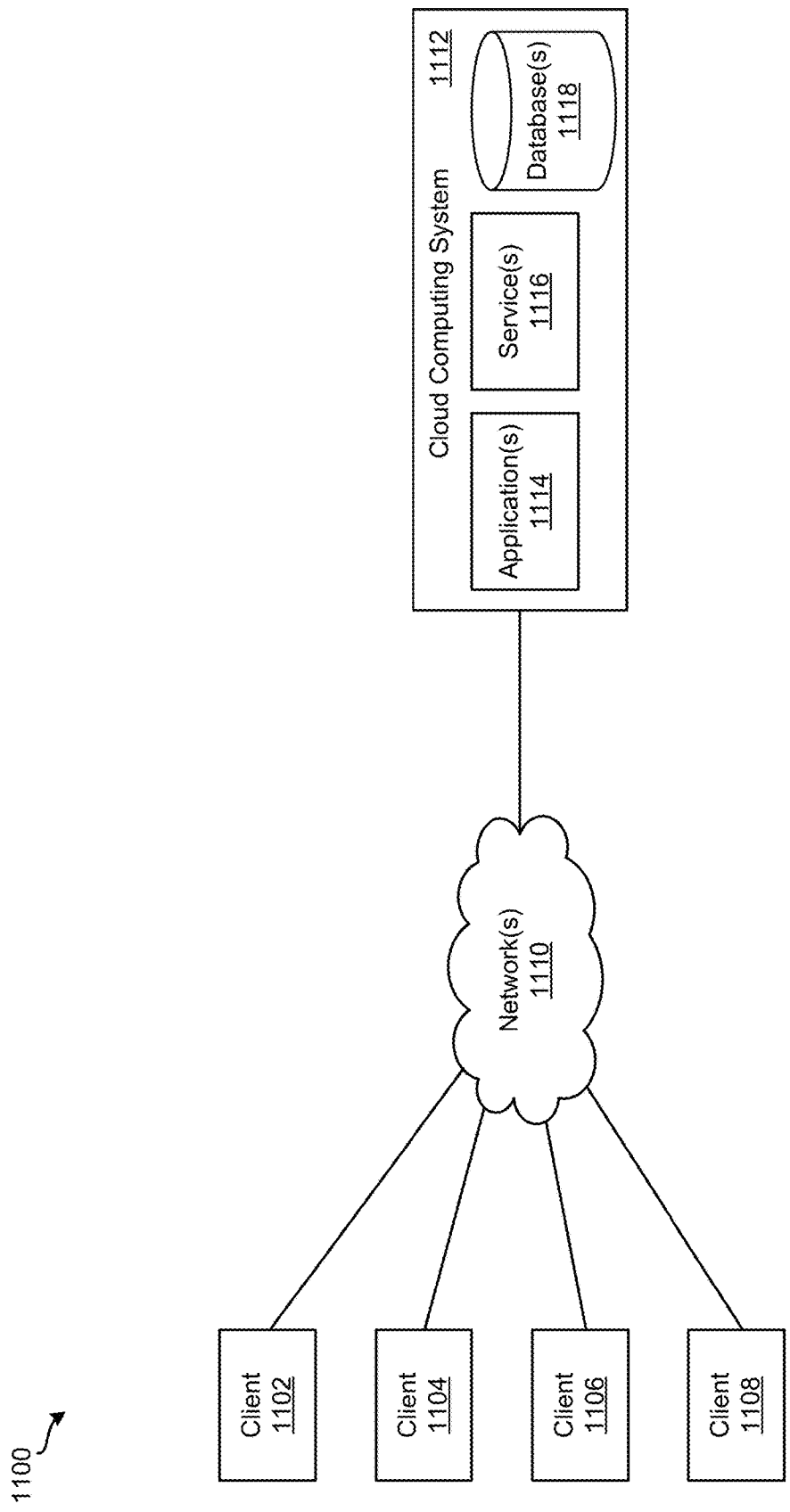
FIG. 11 illustrates system for implementing various embodiments described above.

FIG. 11 illustrates an exemplary system 1100 for implementing various embodiments described above. For example, cloud computing system 1112 may be used to implement computing system 115 and one of client devices 1102-1108 may be used to implement client device 110. As shown, system 1100 includes client devices 1102-1108, one or more networks 1110, and cloud computing system 1112.

Cloud computing system 1112 is configured to provide resources and data to client devices 1102-1108 via networks 1110. In some embodiments, cloud computing system 1100 provides resources to any number of different users (e.g., customers, tenants, organizations, etc.). Cloud computing system 1112 may be implemented by one or more computer systems (e.g., servers), virtual machines operating on a computer system, or a combination thereof.

As shown, cloud computing system 1112 includes one or more applications 1114, one or more services 1116, and one or more databases 1118. Cloud computing system 1100 may provide applications 1114, services 1116, and databases 1118 to any number of different customers in a self-service, subscription-based, elastically scalable, reliable, highly available, and secure manner.

In some embodiments, cloud computing system 1100 may be adapted to automatically provision, manage, and track a customer's subscriptions to services offered by cloud computing system 1100. Cloud computing system 1100 may provide cloud services via different deployment models. For example, cloud services may be provided under a public cloud model in which cloud computing system 1100 is owned by an organization selling cloud services and the cloud services are made available to the general public or different industry enterprises. As another example, cloud services may be provided under a private cloud model in which cloud computing system 1100 is operated solely for a single organization and may provide cloud services for one or more entities within the organization. The cloud services may also be provided under a community cloud model in which cloud computing system 1100 and the cloud services provided by cloud computing system 1100 are shared by several organizations in a related community. The cloud services may also be provided under a hybrid cloud model, which is a combination of two or more of the aforementioned different models.

In some instances, any one of applications 1114, services 1116, and databases 1118 made available to client devices 1102-1108 via networks 1110 from cloud computing system 1100 is referred to as a "cloud service." Typically, servers and systems that make up cloud computing system 1100 are different from the on-premises servers and systems of a customer. For example, cloud computing system 1100 may host an application and a user of one of client devices 1102-1108 may order and use the application via networks 1110.

Applications 1114 may include software applications that are configured to execute on cloud computing system 1112 (e.g., a computer system or a virtual machine operating on a computer system) and be accessed, controlled, managed, etc. via client devices 1102-1108. In some embodiments, applications 1114 may include server applications and/or mid-tier applications (e.g., HTTP (hypertext transport protocol) server applications, FTP (file transfer protocol) server applications, CGI (common gateway interface) server applications, JAVA server applications, etc.). Services 1116 are software components, modules, application, etc. that are configured to execute on cloud computing system 1112 and provide functionalities to client devices 1102-1108 via networks 1110. Services 1116 may be web-based services or on-demand cloud services.

Databases 1118 are configured to store and/or manage data that is accessed by applications 1114, services 1116, and/or client devices 1102-1108. For instance, storages 140-155 may be stored in databases 1118. Databases 1118 may reside on a non-transitory storage medium local to (and/or resident in) cloud computing system 1112, in a storage-area network (SAN), on a non-transitory storage medium local located remotely from cloud computing system 1112. In some embodiments, databases 1118 may include relational databases that are managed by a relational database management system (RDBMS). Databases 1118 may be a column-oriented databases, row-oriented databases, or a combination thereof. In some embodiments, some or all of databases 1118 are in-memory databases. That is, in some such embodiments, data for databases 1118 are stored and managed in memory (e.g., random access memory (RAM)).

Client devices 1102-1108 are configured to execute and operate a client application (e.g., a web browser, a proprietary client application, etc.) that communicates with applications 1114, services 1116, and/or databases 1118 via networks 1110. This way, client devices 1102-1108 may access the various functionalities provided by applications 1114, services 1116, and databases 1118 while applications 1114, services 1116, and databases 1118 are operating (e.g., hosted) on cloud computing system 1100. Client devices 1102-1108 may be computer system 900 or computing device 1000, as described above by reference to FIGS. 9 and 10, respectively. Although system 1100 is shown with four client devices, any number of client devices may be supported.

Networks 1110 may be any type of network configured to facilitate data communications among client devices 1102-1108 and cloud computing system 1112 using any of a variety of network protocols. Networks 1110 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A non-transitory machine-readable medium storing a program executable by at least one processing unit of a device, the program comprising sets of instructions for:
generating labels for a labeled dataset, wherein generating the labels for the labeled dataset comprises:
retrieving a set of notifications from a storage, each notification comprising a set of words describing a failure that occurred on a monitored device in a set of monitored devices;
determining a set of topics based on the sets of words of the set of notifications, each topic being a distribution over words in the set of words;
for each topic in the set of topics, determining a failure mode from a plurality of failure modes defined for the set of monitored devices and associating the determined failure mode with the topic, wherein the failure mode associated with the topic is determined based on at least a similarity between the failure mode and the topic; and
for each notification in the set of notifications, determining a failure mode based on the set of topics and the failure modes associated with the set of topics and associating the determined failure mode with the notification, wherein the labels for the labeled dataset comprises the set of notifications and the determined failure modes associated with the set of notifications;
training a text classification model using the labeled dataset, wherein the text classification model is configured to determine failure modes from user-generated text describing failures;
receiving a particular notification from a client device, the particular notification comprising a particular set of words describing a failure that occurred on a particular monitored device in the set of monitored devices; and
determining, using the text classification model, a failure mode associated with the particular notification based on the particular set of words and the determined failure modes associated with the set of notifications.

2. The non-transitory machine-readable medium of claim 1, wherein a topic in the set of topics comprises a set of related words or phrases that occur in the set of words of the set of notifications.

3. The non-transitory machine-readable medium of claim 1, wherein determining the set of topics is further based on a Latent Dirichlet allocation (LDA) model.

4. The non-transitory machine-readable medium of claim 1, wherein determining, for each topic in the set of topics, the failure mode associated with the topic from the plurality of failure modes defined for the set of monitored devices is based on a Latent Dirichlet allocation (LDA) model.

5. The non-transitory machine-readable medium of claim 1, wherein determining, for each notification in the set of notifications, the failure mode associated with the notification comprises determining a topic in the set of topics associated with the notification and determining the failure mode associated with the notification based on the failure modes associated with the set of topics.

6. The non-transitory machine-readable medium of claim 5, wherein determining, for each notification in the set of notifications, the topic in the set of topics associated with the notification is based on a Latent Dirichlet allocation (LDA) model.

7. The non-transitory machine-readable medium of claim 1, wherein the storage is a first storage wherein determining, for each topic in the set of topics, the failure mode associated with the topic from the plurality of failure modes defined for the set of monitored devices comprises determining a device model associated with the set of monitored devices, determining that the plurality of failure modes are defined for the device model, and retrieving the plurality of failure modes from a second storage configured to store failure mode definitions.

8. A method comprising:
generating labels for a labeled dataset, wherein generating the labels for the labeled dataset comprises:
retrieving a set of notifications from a storage, each notification comprising a set of words describing a failure that occurred on a monitored device in a set of monitored devices;
determining a set of topics based on the sets of words of the set of notifications, each topic being a distribution over words in the set of words;
for each topic in the set of topics, determining a failure mode from a plurality of failure modes defined for the set of monitored devices and associating the determined failure mode with the topic, wherein the failure mode associated with the topic is determined based on at least a similarity between the failure mode and the topic; and for each notification in the set of notifications, determining a failure mode based on the set of topics and the failure modes associated with the set of topics and associating the determined failure mode with the notification, wherein the labels for the labeled dataset comprises the set of notifications and the determined failure modes associated with the set of notifications;

training a text classification model using the labeled dataset, wherein the text classification model is configured to determine failure modes from user-generated text describing failures;

receiving a particular notification from a client device, the particular notification comprising a particular set of words describing a failure that occurred on a particular monitored device in the set of monitored devices; and determining, using the text classification model, a failure mode associated with the particular notification based on the particular set of words and the determined failure modes associated with the set of notifications.

9. The method of claim 8, wherein a topic in the set of topics comprises a set of related words or phrases that occur in the set of words of the set of notifications.

10. The method of claim 8, wherein determining the set of topics is further based on a Latent Dirichlet allocation (LDA) model.

11. The method of claim 8, wherein determining, for each topic in the set of topics, the failure mode associated with the topic from the plurality of failure modes defined for the set of monitored devices is based on a Latent Dirichlet allocation (LDA) model.

12. The method of claim 8, wherein determining, for each notification in the set of notifications, the failure mode associated with the notification comprises determining a topic in the set of topics associated with the notification and determining the failure mode associated with the notification based on the failure modes associated with the set of topics.

13. The method of claim 12, wherein determining, for each notification in the set of notifications, the topic in the set of topics associated with the notification is based on a Latent Dirichlet allocation (LDA) model.

14. The method of claim 8, wherein the storage is a first storage wherein determining, for each topic in the set of topics, the failure mode associated with the topic from the plurality of failure modes defined for the set of monitored devices comprises determining a device model associated with the set of monitored devices, determining that the plurality of failure modes are defined for the device model, and retrieving the plurality of failure modes from a second storage configured to store failure mode definitions.

15. A system comprising:
a set of processing units; and
a non-transitory machine-readable medium storing instructions that when executed by at least one processing unit in the set of processing units cause the at least one processing unit to:

generate labels for a labeled dataset, wherein generating the labels for the labeled dataset comprises:

retrieving a set of notifications from a storage, each notification comprising a set of words describing a failure that occurred on a monitored device in a set of monitored devices;

determining a set of topics based on the sets of words of the set of notifications, each topic being a distribution over words in the set of words;

for each topic in the set of topics, determining a failure mode from a plurality of failure modes defined for the set of monitored devices and associating the determined failure mode with the topic, wherein the failure mode associated with the topic is determined based on at least a similarity between the failure mode and the topic; and for each notification in the set of notifications, determining a failure mode based on the set of topics and the failure modes associated with the set of topics and associating the determined failure mode with the notification, wherein the labels for the labeled dataset comprises the set of notifications and the determined failure modes associated with the set of notifications;

train a text classification model using the labeled dataset, wherein the text classification model is configured to determine failure modes from user-generated text describing failures;

receive a particular notification from a client device, the particular notification comprising a particular set of words describing a failure that occurred on a particular monitored device in the set of monitored devices; and determine, using the text classification model, a failure mode associated with the particular notification based on the particular set of words and the determined failure modes associated with the set of notifications.

16. The system of claim 15, wherein a topic in the set of topics comprises a set of related words or phrases that occur in the set of words of the set of notifications.

17. The system of claim 15, wherein determining the set of topics is further based on a Latent Dirichlet allocation (LDA) model.

18. The system of claim 15, wherein determining, for each topic in the set of topics, the failure mode associated with the topic from the plurality of failure modes defined for the set of monitored devices is based on a Latent Dirichlet allocation (LDA) model.

19. The system of claim 15, wherein determining, for each notification in the set of notifications, the failure mode associated with the notification comprises determining a topic in the set of topics associated with the notification and determining the failure mode associated with the notification based on the failure modes associated with the set of topics.

20. The system of claim 19, wherein determining, for each notification in the set of notifications, the topic in the set of topics associated with the notification is based on a Latent Dirichlet allocation (LDA) model.

* * * * *